(12) United States Patent
Hohberger et al.

(10) Patent No.: US 6,686,829 B1
(45) Date of Patent: Feb. 3, 2004

(54) ELECTRONIC IDENTIFICATION SYSTEM WITH FORWARD ERROR CORRECTION SYSTEM

(75) Inventors: Clive Paul Hohberger, Glencoe, IL (US); Christopher Gordon Gervase Turner, Gauteng (ZA)

(73) Assignee: ZIH Corp., Hamilton (BM)

( * ) Notice: Subject to any disclaimer, the term of this patent is extended or adjusted under 35 U.S.C. 154(b) by 0 days.

(21) Appl. No.: 09/234,149

(22) Filed: Jan. 19, 1999

(30) Foreign Application Priority Data

Jan. 19, 1998  (ZA) .............................................. 98/0410

(51) Int. Cl.[7] .............................................. H04Q 5/22
(52) U.S. Cl. .................... 340/10.1; 340/10.3; 340/10.4; 340/3.43
(58) Field of Search ............................... 340/10.1, 10.3, 340/10.4, 10.41, 10.51, 3.43, 3.44; 724/750, 754, 776, 726, 755, 7.44, 751, 752, 786, 807, 756, 758, 792

(56) References Cited

U.S. PATENT DOCUMENTS

| | | | |
|---|---|---|---|
| 4,691,202 A | * | 9/1987 | Denne et al. .......... 340/825.54 |
| 5,341,396 A | | 8/1994 | Higgins et al. |
| 5,742,618 A | | 4/1998 | Lowe |
| 5,818,348 A | | 10/1998 | Walczak et al. |
| 5,841,770 A | * | 11/1998 | Snodgrass et al. .......... 370/346 |
| 6,289,209 B1 | * | 9/2001 | Wood, Jr. ................ 455/277.1 |
| 6,301,221 B1 | * | 10/2001 | Patterson .................... 370/208 |

\* cited by examiner

*Primary Examiner*—Michael Horabik
*Assistant Examiner*—Vernal Brown
(74) *Attorney, Agent, or Firm*—Babcock IP, LLC

(57) ABSTRACT

An electronic radio frequency (RF) identification system 10 is disclosed and claimed. The system includes an interrogator 11 and a plurality of RF transponders 12.1 to 12.n. In use, each transponder is operative in response to an interrogation signal 14 to respond with a forward error correctable data message 16.1 including base data encoded as symbol characters in accordance with a forward error correcting code, such as a Reed Solomon Code, and check characters on the base data as defined in the forward error correcting code. The interrogator 11 utilizes data relating to the forward error correcting code, the symbol characters and check characters in the received forward error correctable data message, to reconstruct the base data in the event of corruption of the forward error correctable data message during transmission.

6 Claims, 5 Drawing Sheets

ELECTRONIC IDENTIFICATION SYSTEM WITH FORWARD ERROR CORRECTION SYSTEM

INTRODUCTION AND BACKGROUND

THIS invention relates to electronic radio frequency identification (RFID) systems and more particularly to such systems including at least one interrogator or reader and a plurality of transponders.

In known systems of the aforementioned kind, the interrogator is caused to transmit a radio frequency (RF) interrogation signal towards the transponders. The transponders respond to this signal by backscatter modulation of the interrogation signal with a data message including base data which may include an identification code characteristic of the transponder.

During transmission by the transponders a brief burst of high-intensity radio noise from any source may temporarily overload the radio receiver of the interrogator. A noise burst may result from sources including natural phenomena, other active transponders in the interrogator antenna field sending data simultaneously, or signals emitted by other radio services not associated with the RFID system. The effect is to corrupt the data message received for at least some of the duration of the noise burst, resulting in a "burst error" in the message. In a digital network, a noise burst typically results in a burst error in which some or all of a consecutive sequence of data bits are received incorrectly.

A second kind of burst error may occur in the transmitted data bits when the signal is temporarily below the threshold of the receiver of the interrogator due to propagation fading. Alternatively, signal drop out may occur due to cancellation caused by multi-path transmission between the transponder and the interrogator. The net effect on the transmitted data is the same in that a burst error occurs where some or all of a number of consecutive base data bits are received incorrectly.

It has been found that typical burst errors in transmissions of the kind utilized by the system and method according to the invention are four (4) to six (6) bits in length. Since burst errors are a statistical phenomena, this means that there will be many which are shorter and some which may be much longer than 4–6 bits. The burst error length and the average interval between bursts vary with frequency and noise origin. Therefore, any method utilized for correction or compensation for burst errors ideally must be robust enough to handle one or multiple burst errors of varying length within a single data message.

Several approaches may be taken to deal with the effect of burst errors in a digital data message. The first step is to detect that they have occurred. Digital error-detection techniques such as parity checking and the CCITT Cyclic Redundancy Check (CRC) have been used for error detection in systems that use digital messages to carry the base data. A common approach to ensuring accurate communication is to use error detection in conjunction with on-demand retransmission (such as an ACK/NAK protocol) as a method of ensuring accurate data message receipt. The message is retransmitted until no error is detected. This method works as long as there are some clear, noise-free intervals long enough for the entire message to fit into and to be received without error—when the interval between noise bursts is less than the message length, it cannot succeed. For this reason, long messages are usually broken into a sequence of many short data packets, each of which is treated as a separate ordered component of the entire method and transmitted separately. Once all the packets have been received correctly, the complete base data can be accurately reassembled.

A major weakness of this method is that increased communications time is required, both from the extra communications overhead of packet transmission and from the number of retransmissions which may be required for the entire single message (or all its component packets) to be received once without error. A second weakness of this method is that it requires that the data message source be in two-way communication with the receiver. This is not always feasible, as in deep space communications.

Forward Error Correction (FEC) is used when data must be sent over noisy channels, and under situations such as deep space communications, where on-demand retransmission is not feasible. This involves sending some redundant information along with the required base data as part of the entire data message. The receiver can determine from the totality of data sets received in the message whether the base data was correctly received, and use these additional data sets to detect and correct erroneous data bits until the base data can be reconstructed without error, or with an acceptable level of accuracy.

One approach to FEC is to multiply retransmit the base data within the data message, possibly as algorithmically transformed, and apply voting techniques to determine the correct base data bits in the presence of noise. This method was used by Lowe in U.S. Pat. No. 5,742,618. The main disadvantage of this is that it requires multiple copies of the base data to be encoded in the data message as a means of ensuring accurate reception, greatly increasing the transmission time. In addition, while this method requires little computational capability it is non-deterministic in error correction. It requires only that a majority of the received data sets agree; regardless of whether or not they were correctly received.

OBJECT OF THE INVENTION

Accordingly it is an object of the present invention to provide an electronic identification system; a transponder forming part of such a system; and a method of operating a RFID system with which the applicant believes the aforementioned disadvantages may at least be alleviated.

SUMMARY OF THE INVENTION

According to the invention there is provided an electronic identification system including:
  an interrogator for transmitting a radio frequency (RF) interrogation signal;
  a plurality of radio frequency transponders;
  each transponder being operative in response to the interrogation signal to respond with a forward error correctable data message including base data encoded as symbol characters in accordance with a forward error correcting code and check characters on the base data as defined in the forward error correcting code, for facilitating reconstruction of the base data in the event of corruption of the forward error correctable data message during transmission; and
  the interrogator including
    receiver means for receiving the forward error correctable data message; and
    data processor means programmed to utilize data relating to the forward error correcting code, the symbol characters and the check characters in the received forward error correctable data message, to reconstruct the base data in the event of corruption of the received forward error correctable data message.

The forward error correcting code may be a member of the class of trellis codes, more particularly of the class of convolutional codes.

Alternatively, the forward error correcting code may be a member of the class of linear block codes, such as a Hamming Code, a Binary Golay Code and a Reed-Muller Code.

Further alternatively, the forward error correcting code may be a member of the class of cyclic block codes, such as a Fire Code and a Bose-Chaudauri-Hocquenghem Code. Preferably the forward error correcting code is a Reed-Solomon Code.

In one embodiment the system may include a code generator means for generating the forward error correctable data message which generator means is external and separate from the transponders; and each transponder may include: a data memory arrangement into which the forward error correctable data message generated by the external code generator means is pre-programmable to be stored therein; and control circuitry for causing the transponder to respond with the stored forward error correctable data message in response to the interrogation signal.

The code generator means may for example form part of the interrogator.

In another embodiment each transponder may include: a data memory arrangement wherein the base data is stored; and local code generator means forming part of the transponder for locally generating the forward error correctable data message.

Further according to the invention an electronic identification system may include:

an interrogator for transmitting a first radio frequency (RF) interrogation signal;

a plurality of radio frequency transponders;

each transponder being operative in response to the interrogation signal to respond with a forward error correctable data message including: base data in the form of identification code data unique to the transponder encoded as a first set of symbol characters in accordance with a first forward error correcting code, a first set of check characters on the identification code data as defined in the first forward error correcting code, other base data encoded as a second set of symbol characters in accordance with a second forward error correcting code and a second set of check characters on the other base data as defined in the second forward error correcting code, for facilitating reconstruction of the identification code data and other base data in the event of corruption of the forward error correctable data message during transmission; and the interrogator including receiver means for receiving the forward error correctable data messages; and data processor means programmed to utilize data relating to the first forward error correcting code, the first set of symbol characters and the first set of check characters in the received forward error correctable data message; and further programmed to utilize data relating to the second forward error correcting code, the second set of symbol characters and the second set of check characters in the received forward error correctable data message, to reconstruct the identity code data and the other base data respectively, in the event of corruption of the received forward error correctable data message.

The first forward error correcting code and the second forward error correcting code may be the same. However, in a preferred embodiment they are of different types.

The interrogator may be controllable to transmit the first and a second interrogation signal; each transponder may be operative in response to the first interrogation signal to respond with a first forward error correctable data message including the first set of symbol characters and the first set of check characters; each transponder may further be responsive in response to the second interrogation signal to respond with a second error correctable data message including the second set of symbol characters and the second set of check characters; and the data processor means may be programmed to utilize the data relating to the first error correcting code, the first set of symbol characters and the first set of check characters in the received first forward error correctable data message to reconstruct the identification code data in the event of corruption of the received first forward error correctable data message; and the data processor means may be programmed further to utilize the data relating to the second error correcting code, the second set of symbol characters and the second set of check characters in the received second forward error correctable data message, to reconstruct the other base data in the event of corruption of the received second forward error correctable data message.

The invention also includes within its scope a transponder for use with an electronic identification system including an interrogator for transmitting a radio frequency interrogation signal and for receiving a response signal from the transponder, the transponder including control means; and a data memory arrangement into which is programmable data associated with the transponder;

the control means being operative in response to an interrogation signal to utilize the data associated with the transponder to cause the transponder to respond with a forward error correctable data message including base data relating to the transponder encoded as symbol characters in accordance with a forward error correcting code; and check characters on the base data as defined in the forward error correcting code, for facilitating reconstruction of the base data in the event of corruption of the forward error correctable data message during transmission.

The forward error correcting code may be a member of any one of the aforementioned classes, but preferably is a Reed-Solomon Code.

In some embodiments of the transponder, the data memory arrangement may be configured to be programmed with the forward error correctable data message as pre-generated by an external code generation means for storage therein; and the control means may, in use, utilize the stored forward error correctable data message to respond to the interrogation signal.

In other embodiments, the data memory arrangement may be configured to be programmed with the base data; the transponder may include local code generator means for locally generating the forward error correctable data message; and the control means may, in use, utilize the locally generated forward error correctable data message to respond to the interrogation signal.

Also included within the scope of the present invention is a method of operating an electronic radio frequency identification system including an interrogator and at least one transponder; the method including the steps of:

causing an interrogation signal to be transmitted by the interrogator;

causing the transponder to respond to the interrogation signal with a forward error correctable data message including base data encoded as symbol characters in accordance with a forward error correcting code and check characters on the base data as defined in the forward error correcting code, for facilitating reconstruction of the base data in the event of corruption of the forward error correctable message during transmission;

receiving the forward error correctable data message; and causing an error correction means to utilize data relating to the forward error correcting code, the symbol characters and the check characters in the received forward error correctable data message, in order to reconstruct the base data in the event of corruption of the received forward error correctable data message.

Another method of operating an electronic radio frequency identification system including an interrogator and at least one transponder may include the steps of:

causing a first interrogation signal to be transmitted by the interrogator; and causing the transponder to respond to the interrogation signal with a forward error correctable data message including: base data in the form of identification code data unique to the transponder encoded as a first set of symbol characters in accordance with a first forward error correcting code, a first set of check characters on the identification code data as defined in the first forward error correcting code, other base data encoded as a second set of symbol characters in accordance with a second forward error correcting code and a second set of check characters on the other base data as defined in the second forward error correcting code;

receiving the forward error correctable data message; and causing an error correction means to utilize data relating to the first forward error correcting code, the first set of symbol characters and the first set of check characters in the received forward error correctable data message; and further to utilize data relating to the second forward error correcting code, the second set of symbol characters and the second set of check characters in the received forward error correctable data message, in order to reconstruct the identity code data and the other base data respectively, in the event of corruption of the received forward error correctable data message.

As stated hereinbefore, the first forward error correcting code and the second forward error correcting code are preferably of different types.

Another form of the method may include the steps of: causing a selected one of the first and a second interrogation signal to be transmitted; causing each transponder in response to the first interrogation signal to respond with a first forward error correctable data message including the first set of symbol characters and the first set of check characters; causing each transponder in response to the second interrogation signal to respond with a second error correctable data message including the second set of symbol characters and the second set of check characters; causing the first and second error correctable data messages to be received; causing the error correction means to utilize data relating to the first error correcting code, the first set of symbol characters and the first set of check characters in the received first forward error correctable data message to reconstruct the identification code data in the event of corruption of the received first forward error correctable data message; and causing the error correction means to utilize data relating to the second error correcting code, the second set of symbol characters and the second set of check characters in the received second forward error correctable data message, to reconstruct the other base data in the event of corruption of the received second forward error correctable data message.

BRIEF DESCRIPTION OF THE ACCOMPANYING DIAGRAMS

The invention will now further be described, by way of example only, with reference to the accompanying diagrams wherein.

DESCRIPTION OF A PREFERRED EMBODIMENT OF THE INVENTION

Figure 1:
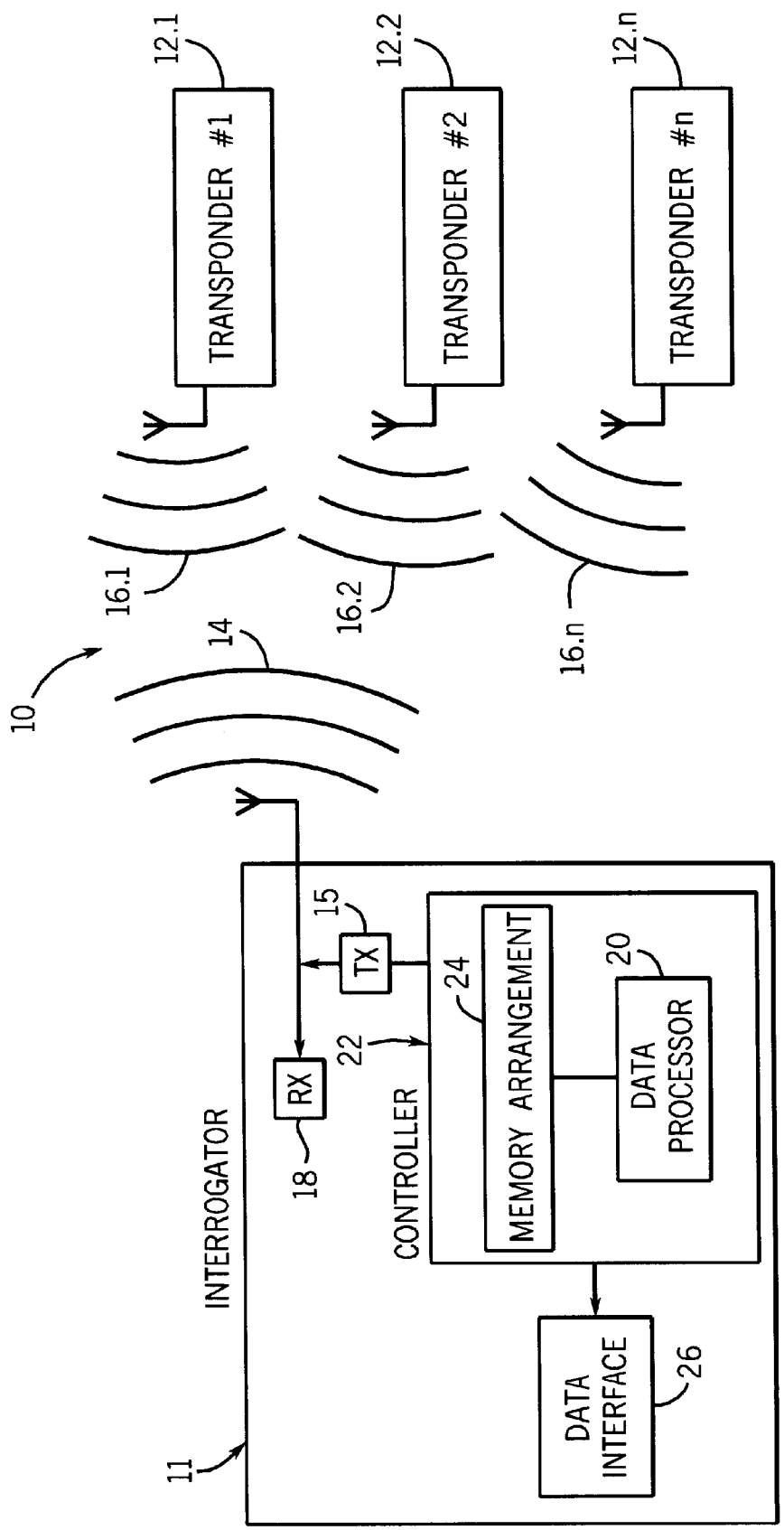
FIG. 1 is a basic block diagram of an electronic radio frequency identification RFID system according to the invention.

An electronic radio frequency identification (RFID) system according to the invention is generally designated by the reference numeral 10 in FIG. 1.

The system includes an interrogator or reader 11 and a plurality of similar transponders numbered transponder #1 to transponder #n and designated 12.1 to 12.n respectively. In use, the interrogator is caused to transmit an interrogation signal 14 via transmitter 15. The transponders are energized by the interrogation signal and they are caused to respond to the interrogation signal by backscatter modulation of the interrogation signal with a forward error correctable data message (which will be described in more detail hereinafter) to form response signals 16.1 to 16.n.

In use, the interrogator sequentially latches onto one of the response signals, receives the signal via receiver 18 and reads the data message. The data message is then processed as will hereinafter be described by a data processor 20 of a controller 22 of the interrogator 11, also including a memory arrangement 24 associated with the data processor. Also connected to the controller is a data interface 26 for use in appropriate cases in pre-programming selected ones of transponders 12.1 to 12.n with a forward error correctable data message as will also be described hereinafter.

Figure 2:
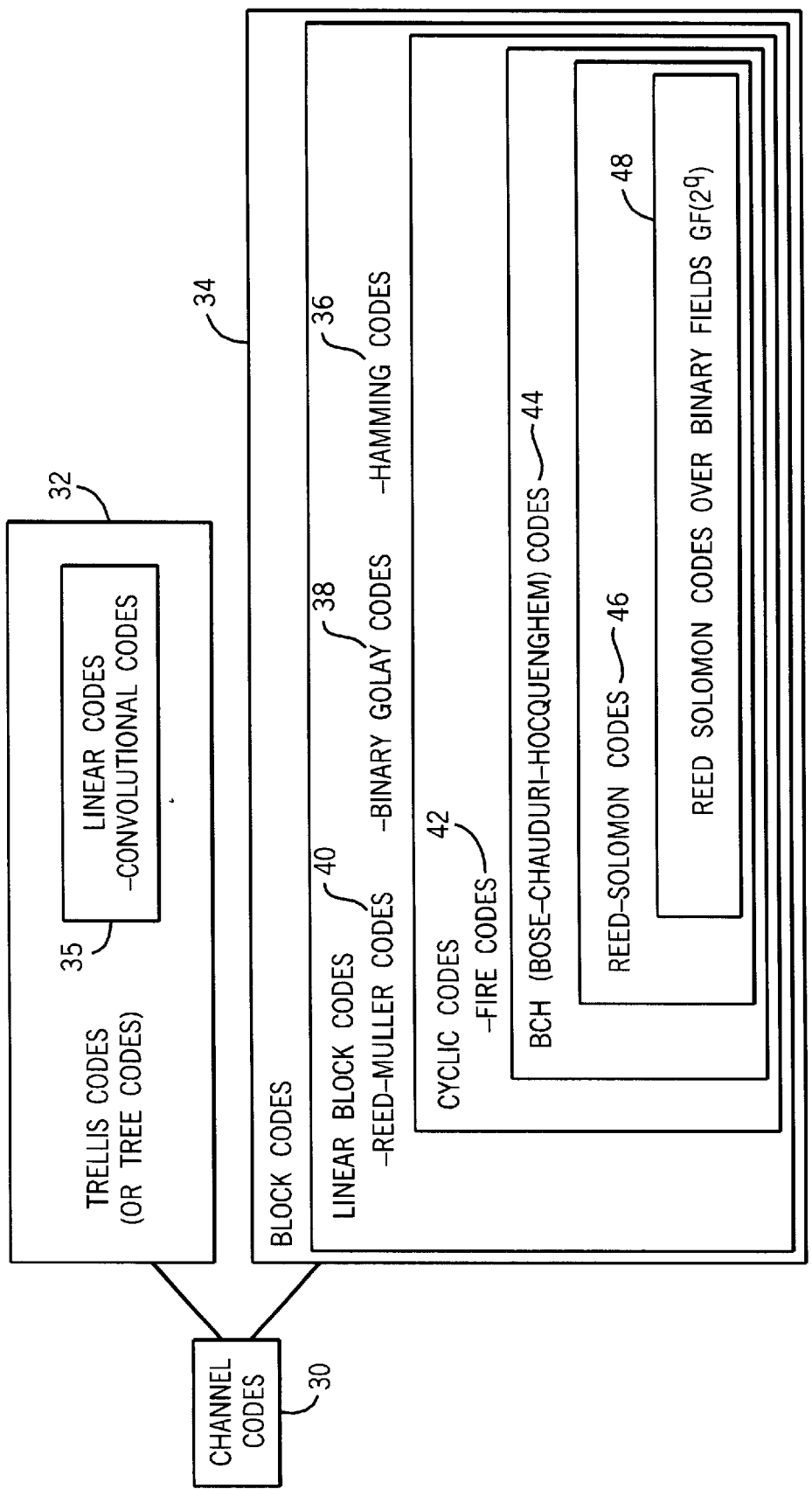
FIG. 2 is a diagram illustrating the taxonomy of forward error correcting channel codes.

According to the invention base data associated with the transponders is encoded by forward error correcting (FEC) channel codes 30 shown in FIG. 2. In terms of these codes, check symbols are added to the symbol character encoded base data during FEC encoding, to facilitate correction of possibly corrupted data bits in the response signal in an algorithmic manner. Use of forward error correcting codes allows the data to be recovered in the presence of a predetermined maximum amount of message corruption in the transmission process. FEC reduces the number of retransmissions required for transponder identification code or "license plate" data and/or other data to be received correctly, particularly when either a plurality of simultaneously transmitting transponders is present and/or the transponder to be read is near its maximum read range, wherein the weak received signal is most affected by burst noise or fading. It thus avoids redundantly re-transmitting the same message, as proposed by Lowe in U.S. Pat. No. 5,742,618. This may result in an improvement in the speed of reading the data transmitted by the transponders 12.1 to 12.n.

The family of channel codes 30 important for use in FEC is shown schematically in FIG. 2.

Trellis Codes 32, in contrast to Block Codes 34, are used to encode an arbitrarily long input message into an arbitrarily long output message without dividing it into blocks. A finite state encoder (not shown) determines each output code symbol based on the input symbol and the current encoder state.

Linear Trellis Codes are also known as convolutional codes 35, because the output code may be viewed as the mathematical discrete convolution of the input message with the encoder's impulse response.

Block Codes 34 operate by dividing the base data into blocks of a predefined length. The characters in each block are divided into symbol characters encoding the base data, and check characters generated according to some coding algorithm, and depending only on the symbol characters in that block and the nature or type of the forward error correcting code used.

Block Codes 34 encode the base data into k symbol characters in a block of length n characters, of which (n-k) characters are used for error detection or both error detection and correction. Hamming Codes 36 were amongst the first of the forward error correcting Block Codes. These linear codes were designed to correct any single error in the message block. The binary Hamming Codes capable of encoding $h=(2^m-1)$ values, added a series of (n-h) parity check characters to the binary data message. Simple logic circuits can then be used to correct a single bit error.

Binary Golay Codes 38 are more powerful than Hamming Codes 36, in that they can correct multiple errors within the block. However, they require a more complex decoding and have practical limitations on block length.

Reed-Muller Codes 40 are a class of linear codes defined over binary Galois Fields. They are particularly easy to encode and decode. Linear shift registers can be used for generating the code, and majority logic can be used for evaluating the parity check equations.

Fire Codes 42 were the first multiple-error correcting Cyclic Codes that were systematically constructed for correcting burst errors in binary data transmission.

Cyclic Codes 42 are a subset of linear Block Codes which have character properties that make them easier to encode and decode than most linear Block Codes. Of the Cyclic Codes, the Bose-Chauduri-Hocquesghem (BCH) Codes 44 are characterized by powerful multiple error correction capabilities that are efficient in terms of the number of check characters required.

Reed-Solomon Codes 46 and more particularly Reed Solomon Codes over Binary Fields ($GF2^q$) are an important subclass of the BCH Cyclic Codes which are optimized for correction of data messages subjected to burst errors.

The techniques are properties of channel coding methods are well known and may be found in handbooks such as (a) Blahut, R. *Theory and Practice of Error Control Codes*, 2$^{nd}$ Edition. Addison-Wesley; Reading, Mass., USA 1984; (b) Lin, S and D J Costello *Error Control Coding: Fundamentals and Applications*. Prentice-Hall; Englewood Cliffs, N.J., USA 1983; (c) Wilson, S G. *Digital Modulation and Coding*. Prentice Hall; Upper Saddle River, N.J., USA 1996; and (d) Wicker, S. B. and V. K Bhargava *Reed-Solomon Codes and Their Applications*. IEEE Press; Piscataway, N.J., USA 1994. Relevant parts of the tests of these handbooks are incorporated herein by reference.

In Reed-Solomon Codes defined over binary extension Galois Fields $GF(2^q)$ binary data is encoded by breaking it into symbol characters of length q bits. Symbol characters are arranged in blocks of length $n=(2^q-1)$ with each block including k Reed-Solomon check characters. The check characters have the properties that all k check characters are functions of all of the (n-k) symbol characters. All of the Reed-Solomon check characters may be used to both detect errors and correct errors within the total message block including both the symbol characters and the check characters.

During transmission of the Reed-Solomon symbol and check character stream, where each character is q-bits long, if a burst error of length m bits occurs, where $1 \leq m \leq q$, then a minimum of b=1 and a maximum of b=2 consecutive Reed-Solomon symbol characters will be corrupted for any burst length m=1,2,3, . . . q. For longer noise bursts, the maximum number of consecutive corrupted symbol characters will be less than or equal to (M mod q)+1. The resulting multiple-bit burst errors are confined to a small number of correctable q-bit Reed-Solomon characters.

The Rieger Bound Theorem states that in order to correct all burst errors of length b or less, a block code must have at least 2 b parity check symbols. For any block code of block length n with k check characters, $$(n-k)-2\ b=z$$

where z is a measure of the inefficiency of the block code. For Reed-Solomon codes, z=0, so that Reed-Solomon Codes are highly efficient for correction of corrupted symbols. Two check characters can be used to correct any corrupted symbol character in the block at an unknown position within that block. One check character in effect localizes the erroneous symbol character and one check character is used to correct its magnitude or its value. In addition, when the position of a corrupted symbol character is known, it may be treated as an "erasure," requiring only a single check character to correct the value. The maximum number of correctable erasures, v and correctable errors, t that a Reed-Solomon Code $GF(2^q)$ with k check characters per block of length $n=(2^q-1)$ can correct is given by:

$$2t+v \leq k$$

If erasures cannot be known per se, then v=0 for practical purpose. This is the normal case for binary data transmission in the system and method described herein. A given symbol or check character cannot be arbitrarily determined to be correct or incorrect by isolated examination, therefore those symbol characters which are erasures cannot be determined.

It is believed that at present Reed-Solomon Codes are the most powerful of the multiple-burst error-correcting codes.

The maximum single burst length correctable is $m_{max}=(qt-1)$ bits in length. Since burst errors may occur more frequently than once per block, the error-correcting code should therefore be capable of correcting multiple bursts per message. Reed-Solomon Codes permit that any number of multiple burst errors of varying length within a given block of (n-k) symbols may be corrected up to the error correction capacity of the block, or t symbols.

In practice, the algorithm for error correction may have multiple base data solutions, particularly in heavily corrupted message blocks. For this reason, it is common to reserve p check characters of the k available in each block for "misdecode protection" to check the corrected solution. The probability of a misdecode is thus reduced to $1:(2^q)^p = 1:2^{qp}$. The revised formula for the maximum error correction capacity, t, for the system and method described herein now becomes:

$$2t \leq (k-p)$$

Calculation of the Reed-Solomon check digits and symbols during message encodation is computationally relative simple. Many methods utilizing either state machines or computer programs are known, several of which may be found in the aforementioned references.

A message incorporating Reed-Solomon error correction may check for the presence of errors in a similar manner. The methods for determining the location of and correct value for corrupted symbol characters are also known. These may be computationally intensive, but well within the capability of a wide range of commercially available microprocessors.

The above principles are now described in a preferred embodiment for a transponder having base data of 256-bits long associated therewith. Referring to FIG. 1, it is assumed in this embodiment that only the return data transmission 16.1 to 16.n from the transponder 12.1 to 12.m to the interrogator 11 is encoded using forward error correction, because these return signals 16.1 to 16.n are typically −60 db or more below the interrogation signal 14 received at the transponders 12.1 to 12.n. However, there is no theoretical barrier to applying these specified or other FEC methods for communication from the interrogator 11 to a transponder 12.1 to 12.n.

Figure 3:
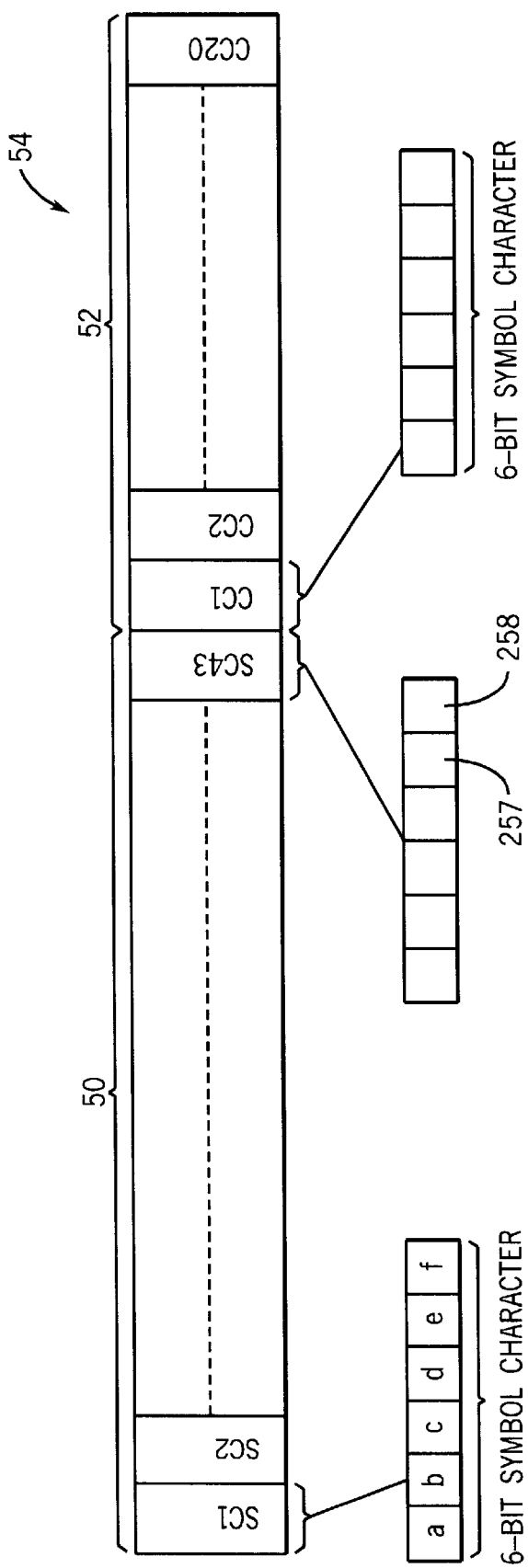
FIG. 3 is one example of a forward error correctable data message transmitted by transponders forming part of the system.

Referring to FIG. 3, this preferred embodiment utilizes a Reed-Solomon Code based on a binary Galois Extension Field GF ($2^6$). The 256 bits in the base data are encoded as forty-three (43) six-bit symbol characters (SC1 to SC43) collectively designated 50, with two zero pad bits in the forty-third character SC43 in bit positions 257 and 258.

A block size $n=(2^6-1)=63$ would be used with k=20 Reed-Solomon 6-bit check characters (CC1 to CC20) collectively designated 52 accompanying the (n-k)=43 six-bit symbol characters. Four misdecode protection characters (p=4) would ensure that the probability of an error in the base data resulting from a decoding ambiguity during error correction would be $1:(2^6)^4=1:2^{24}=1:16,777,216$. The remaining 2t=16 check characters would enable correction of up to eight symbol characters. The sixteen check characters when used for error correction will further decrease the probability of erroneous decode to 1:(16,777,216×8). The total error correctable data message 54 transmitted would be n=63 six-bit Reed-Solomon characters or 378 bits.

Multiple burst errors could be corrected, if not more than t=8 symbol characters were corrupted. The longest unsynchronized correctable single burst error would be $m_{max}=q(t-1)+1=6(8-1)+1=43$ bits in length. With an average burst error length of six bits, at least four burst errors (each extending over two symbol characters and/or check characters) could be corrected within each transmission. Both longer single burst errors and multiple burst errors across any combination of more than eight symbol and/or check characters would be detected even though not correctable.

Figure 4:
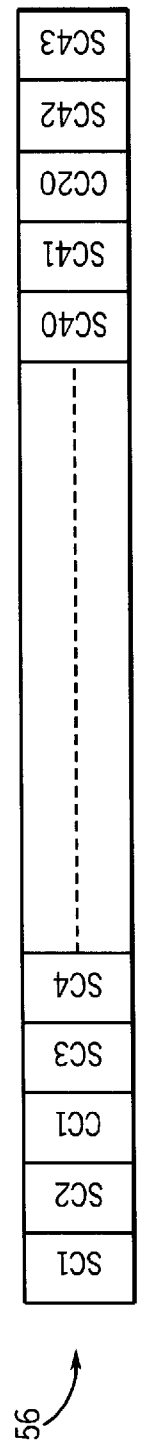
FIG. 4 is another example of a forward error correctable data message transmitted by transponders forming part of the system.
Figure 5:
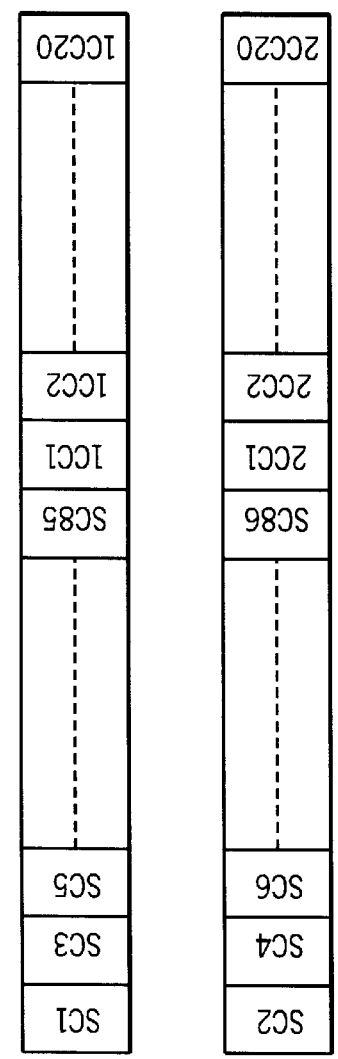
FIG. 5 is yet another example of the message, but wherein characters in the message are arranged in two blocks.

Since a single block is used here, the ordering of the symbol characters and Reed-Solomon check characters within the block is not critical. In FIG. 4 there is shown a diagram of a forward error correctable data message 56 wherein the check characters CC1 to CC20 are distributed amongst the symbol characters SC1 to SC43. As shown in FIG. 5, when the data message length is longer than one block, the similarly positioned characters in each of the multiple blocks 58 and 60 should be interleaved so that burst errors are spread over multiple blocks as well as across multiple symbols within each block. In this example the base data is 512 bits and the forward error correctable data message is arranged into two blocks 58 and 60, each including forty-three six-bit symbol characters and twenty six-bit check characters. The symbol characters are designated SC1, SC2, ..., SC86 and the check characters 1CC1, 1CC2, ... 1CC20 and 2CC1, 2CC2, ..., 2CC20. In order to improve the immunity to burst errors the symbol characters SC1, ..., SC86 are interleaved between the two blocks.

In other applications it may be necessary to separate out from other data in the base data transponder identification code or "licence plate" data uniquely relating to the transponder. The other data may include data relating to an article (not shown) or the like with which the transponder is associated in use. The two sets of data are then separately encoded so that each has its own symbol characters and check characters appended to the train of symbol characters. A block including such a forward error correctable data message is illustrated at 62 in FIG. 6. The symbol characters of the licence plate data are shown as LD1 to LD13 with the associated check characters as CLP1 to CLP6. The symbol characters of the other data is shown as OD1 to OD42 with the associated check characters COD1 to COD20. In some applications, the two data sets may also be separately and selectively transmitted in response to first and second interrogation signals respectively. First and second error correctable data messages 64 and 66 may thus be generated wherein an error correcting code of a first type is used to encode the licence plate data and an error correcting code of a second type is used to encode the other data. The messages may further be decoded separately to increase the speed of reading at least the transponder identification code data. This is useful when searching for a specific transponder among a plurality of transponders or rapidly identifying all the transponders in the volume seen by the interrogator. The separate transmission and decoding of the forward error correctable data message 64 including the identification code data become increasingly useful as the other data in the base data grows in length, because of the increased computation required in the forward error correction procedures for long messages.

The computational requirement for the transponder may be satisfied by use of either an internal or an external encoder to encode the base data message into the Reed-Solomon symbol characters and to calculate the Reed-Solomon check character values. Where the computational requirements are modest, it could be done with internal or local state machine logic using shift registers forming part of the transponder. This is particularly useful when the base data stored in the transponder is programmable or otherwise subject to change.

Figure 7:
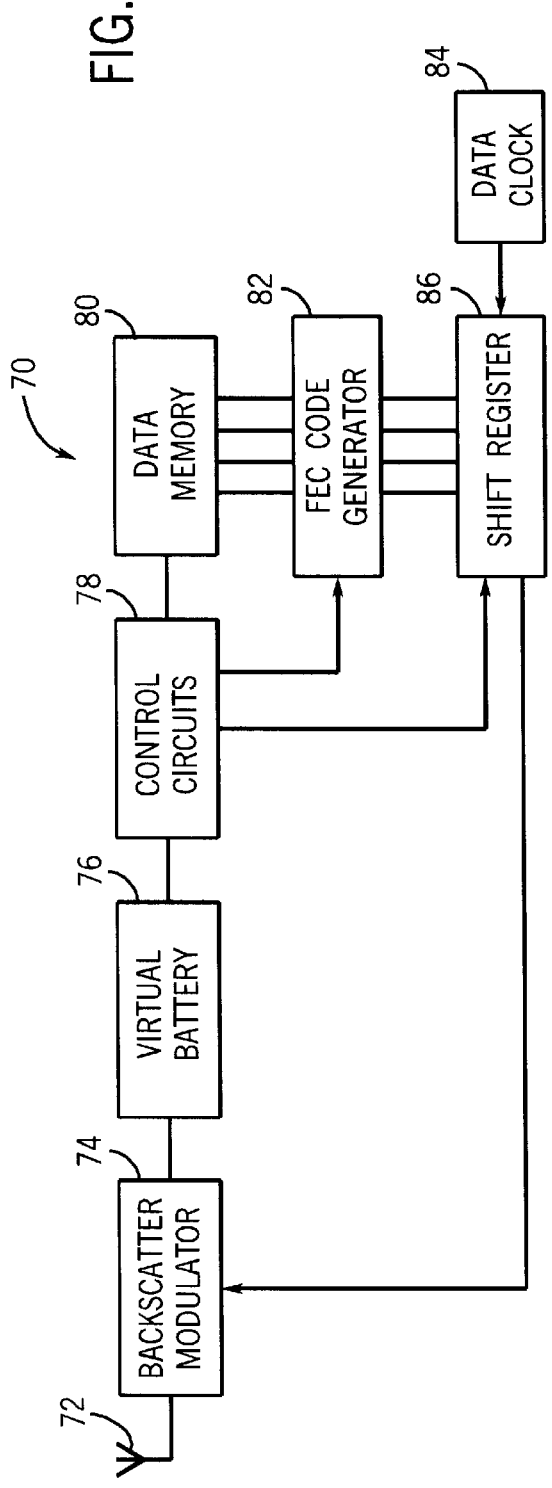
FIG. 7 is a basic block diagram of one embodiment of a transponder according to the invention.

A block diagram of one embodiment of a transponder having this internal capability is designated 70 in FIG. 7. The transponder includes an antenna 72, a backscatter modulator 74, a virtual battery 76, control circuits 78 and a data memory arrangement 80 wherein the base data is stored. The base data may include identification code data or licence plate data and other data. A local FEC code generator 82 including state machine logic and shift registers generate the forward error correctable data message embodying the base data. A data clock 84 and shift register 86 are utilized by the control circuits 78 to control the backscatter modulator 74, to backscatter modulate the interrogation signal with the forward error correctable data message as hereinbefore described. The base data may be pre-programmed into the data memory by an external-programming device (not shown). In the same manner, the base data may subsequently be changed.

Alternatively, if the base data is intended to remain fixed, all error check character calculations may be performed by an external code generation device and then be directly written into the transponder together with the base data in symbol form, thus avoiding the need for any check character calculation within the transponder itself.

Figure 8:
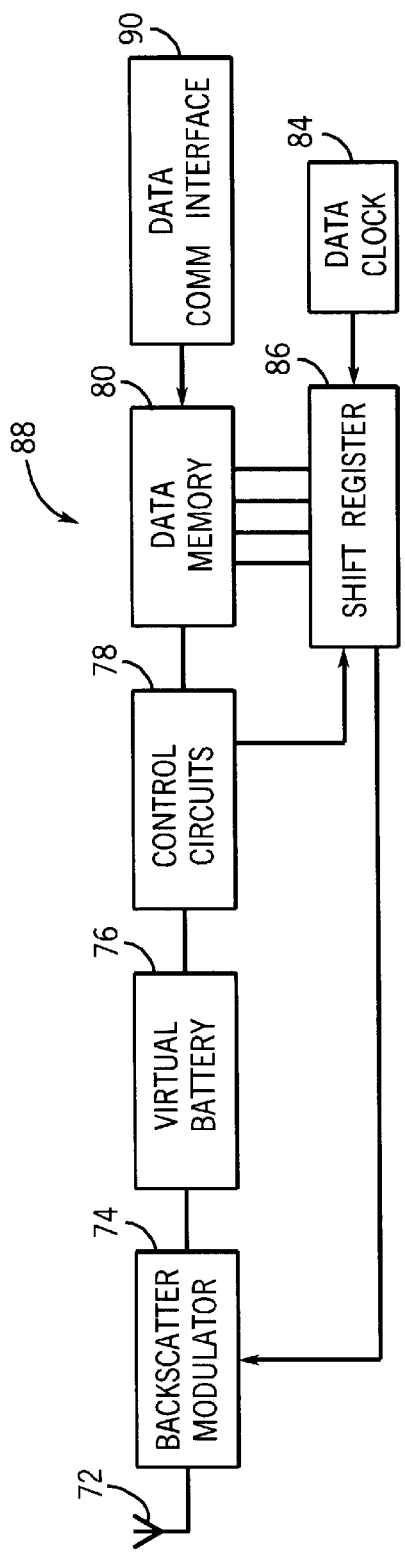
FIG. 8 is a basic block diagram of another embodiment of a transponder according to the invention.

A block diagram of a transponder 88 operating on this basis is shown in FIG. 8. The transponder is similar to the one shown in FIG. 7, except that it does not include a local FEC code generator. The forward error correctable data message is generated by the external code generation device, which may for example be embodied in the interrogator 11. The entire forward error correctable data message, once generated by the data processor 20 of the interrogator 11, is downloaded into the data memory arrangement 80 of the transponder 88 via a data communication path including data interface 26 of the interrogator 11 and data interface 90 of the transponder 88.

To decode the forward error correctable data message, the interrogator 11 requires the capability to perform the complex calculations required to first determine if an error exists, then determine the symbol character in error, and then correct its magnitude. The computational processes used in error correction typically includes the Berlekamp-Massey Procedure, Chien Search and Forney Procedure which are known and descriptions may be found in the references referred to herein. Alternate Reed-Solomon error correction methods to locate errors and correct their magnitude values are also known.

It will be appreciated that there are many variations in detail on the system, the transponder and the method according to the invention without departing from the scope and spirit of the appended claims.

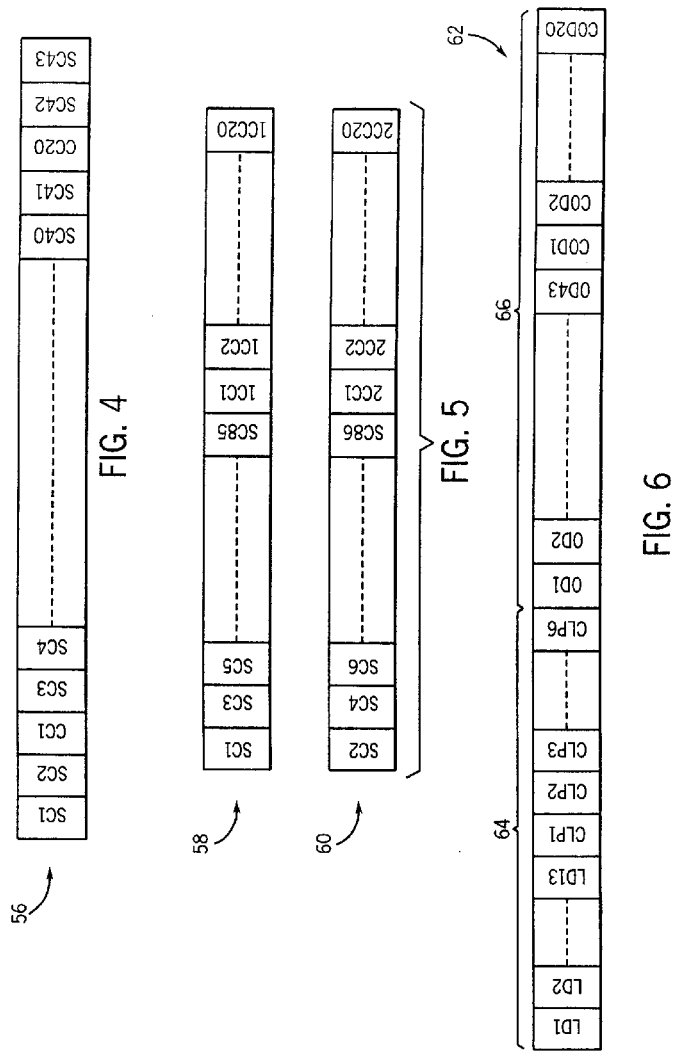

What is claimed is:

1. An electronic identification system including:
   an interrogator for transmitting a first radio frequency (RF) interrogation signal;
   a plurality of radio frequency transponders;
   each transponder being operative in response to the interrogation signal to respond with a forward error correctable data message including: base data in the form of identification code data unique to the transponder encoded as a first set of symbol characters in accordance with a first forward error correcting code, a first set of check characters on the identification code data as defined in the first forward error correcting code, other base data encoded as a second set of symbol characters in accordance with a second forward error correcting code and a second set of check characters on the other base data as defined in the second forward error correcting code, for facilitating reconstruction of the identification code data and other base data in the event of corruption of the forward error correctable data message during transmission; and
   the interrogator including
      receiver means for receiving the forward error correctable data messages; and
      data processor means programmed to utilize data relating to the first forward error correcting code, the first set of symbol characters and the first set of check characters in the received forward error correctable data message; and further programmed to utilize data relating to the second forward error correcting code, the second set of symbol characters and the second set of check characters in the received forward error correctable data message, to reconstruct the identity code data and the other base data respectively, in the event of corruption of the received forward error correctable data message.

2. An electronic identification system as claimed in claim 1, wherein the first forward error correcting code and the second forward error correcting code are of different types.

3. A system as claimed in claim 1 wherein the interrogator is controllable to transmit the first and a second interrogation signal; wherein each transponder is operative in response to the first interrogation signal to respond with a first forward error correctable data message including the first set of symbol characters and the first set of check characters; wherein each transponder is further responsive in response to the second interrogation signal to respond with a second error correctable data message including the second set of symbol characters and the second set of check characters; and wherein the data processor means is programmed to utilize the data relating to the first error correcting code, the first set of symbol characters and the first set of check characters in the received first forward error correctable data message to reconstruct the identification code data in the event of corruption of the received first forward error correctable data message; and wherein the data processor means is further programmed to utilize the data relating to the second error correcting code, the second set of symbol characters and the second set of check characters in the received second forward error correctable data message, to reconstruct the other base data in the event of corruption of the received second forward error correctable data message.

4. A method of operating an electronic radio frequency identification system including an interrogator and at least one transponder; the method including the steps of:
   causing a first interrogation signal to be transmitted by the interrogator; and
   causing the transponder to respond to the interrogation signal with a forward error correctable data message including: base data in the form of identification code data unique to the transponder encoded as a first set of symbol characters in accordance with a first forward error correcting code, a first set of check characters on the identification code data as defined in the first forward error correcting code, other base data encoded as a second set of symbol characters in accordance with a second forward error correcting code and a second set of check characters on the other base data as defined in the second forward error correcting code;
   receiving the forward error correctable data message; and
   causing an error correction means to utilize data relating to the first forward error correcting code, the first set of symbol characters and the first set of check characters in the received forward error correctable data message; and further to utilize data relating to the second forward error correcting code, the second set of symbol characters and the second set of check characters in the received forward error correctable data message, in order to reconstruct the identity code data and the other base data respectively, in the event of corruption of the received forward error correctable data message.

5. A method as claimed in claim 4 wherein the first forward error correcting code and the second forward error correcting code are of different types.

6. A method as claimed in claim 5, including the steps of: causing a selected one of the first and a second interrogation signal to be transmitted; causing each transponder in response to the first interrogation signal to respond with a first forward error correctable data message including the first set of symbol characters and the first set of check characters; causing each transponder in response to the second interrogation signal to respond with a second error correctable data message including the second set of symbol characters and the second set of check characters; causing the first and second error correctable data messages to be received; causing the error correction means to utilize data relating to the first error correcting code, the first set of symbol characters and the first set of check characters in the received first forward error correctable data message to reconstruct the identification code data in the event of corruption of the received first forward error correctable data message; and causing the error correction means to utilize data relating to the second error correcting code, the second set of symbol characters and the second set of check characters in the received second forward error correctable data message, to reconstruct the other base data in the event of corruption of the received second forward error correctable data message.

* * * * *

UNITED STATES PATENT AND TRADEMARK OFFICE
CERTIFICATE OF CORRECTION

PATENT NO.     : 6,686,829 B1
DATED          : January 19, 1999
INVENTOR(S)    : Hohnberger et al.

Figure 6:
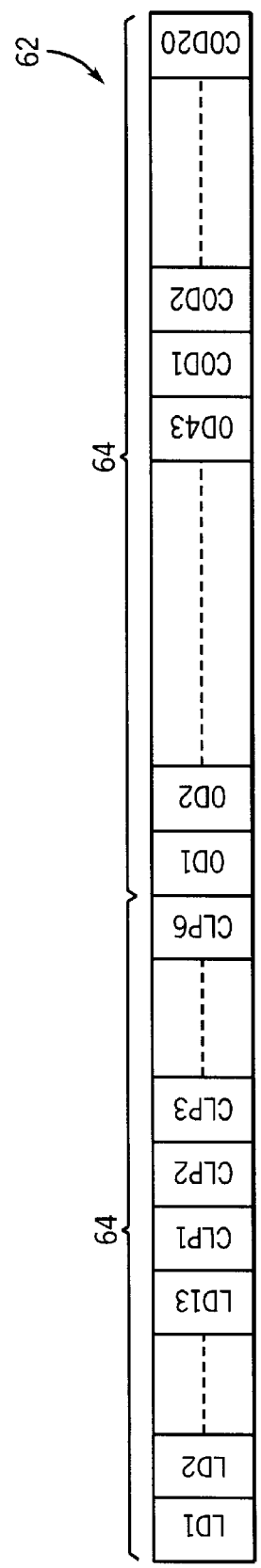
FIG. 6 is yet another example of the message, but where it is divided into first and second parts, each with its own check characters.

It is certified that error appears in the above-identified patent and that said Letters Patent is hereby corrected as shown below:

Drawings,
Replace old drawings and insert the attached new drawings.
Figure 6, the notation above "0D43" should be -- 66 -- not "64".

Signed and Sealed this

Sixth Day of July, 2004

JON W. DUDAS
*Acting Director of the United States Patent and Trademark Office*